A. C. HALLBOM.
MECHANICAL OILING DEVICE.
APPLICATION FILED JAN. 24, 1920.

1,361,458.

Patented Dec. 7, 1920.
8 SHEETS—SHEET 1.

Inventor
Algot C. Hallbom
By his Attorneys
Kenyon & Kenyon

A. C. HALLBOM.
MECHANICAL OILING DEVICE.
APPLICATION FILED JAN. 24, 1920.

1,361,458.

Patented Dec. 7, 1920.
8 SHEETS—SHEET 2.

Fig. 3.

INVENTOR
Algot C. Hallbom
BY
Kenyon & Kenyon
his ATTORNEYS

A. C. HALLBOM.
MECHANICAL OILING DEVICE.
APPLICATION FILED JAN. 24, 1920.

1,361,458.

Patented Dec. 7, 1920.
8 SHEETS—SHEET 3.

Fig. 4.

INVENTOR
Alfat C. Hallbom
BY
Kenyon & Kenyon
his ATTORNEYS

A. C. HALLBOM.
MECHANICAL OILING DEVICE.
APPLICATION FILED JAN. 24, 1920.

1,361,458.

Patented Dec. 7, 1920.
8 SHEETS—SHEET 5.

INVENTOR
Algot C. Hallbom
BY
Kenyon & Kenyon
his ATTORNEYS

A. C. HALLBOM.
MECHANICAL OILING DEVICE.
APPLICATION FILED JAN. 24, 1920.

1,361,458.

Patented Dec. 7, 1920.
8 SHEETS—SHEET 6.

INVENTOR
Algot O. Hallbom,
BY
Kenyon & Kenyon
his ATTORNEYS

UNITED STATES PATENT OFFICE.

ALGOT C. HALLBOM, OF NEW YORK, N. Y.

MECHANICAL OILING DEVICE.

1,361,458.   Specification of Letters Patent.   Patented Dec. 7, 1920.

Application filed January 24, 1920. Serial No. 353,781.

*To all whom it may concern:*

Be it known that I, ALGOT C. HALLBOM, a subject of the King of Sweden, and a resident of New York city, in the county and State of New York, have invented certain new and useful Improvements in Mechanical Oiling Devices, of which the following is a specification.

My invention relates to mechanical oilers and is useful in lubricating the moving parts such as cranks, cross-heads and so forth of engines or similar devices where said parts cannot be lubricated to advantage by the ordinary wick or drip devices, but otherwise have to be lubricated by hand.

It is an object of my invention to produce a device which is thoroughly reliable and as simple and rugged as a device having the desired reliability can be. Another object of my invention is to do by automatic, mechanical means that which it has heretofore been necessary to employ men with considerable skill to do, and also to eliminate the element of uncertainty which accompanies tasks accomplished by human hands. It is often found that damage is done and bearings are overheated by the negligence of oilers and great expense and inconvenience caused by such negligence.

My device operates in harmony with the machine to be lubricated, the same being connected to some moving part of the engine.

While the device operates automatically, means are also provided whereby in the case of emergencies extra lubricant is available at the desire of the engineer. It is, therefore applicable to periodic and occasional functioning and in all instances works with great precision and reliability.

My invention will be better understood by reference to the accompanying drawings forming a part of this application and in which—

Figure 1:
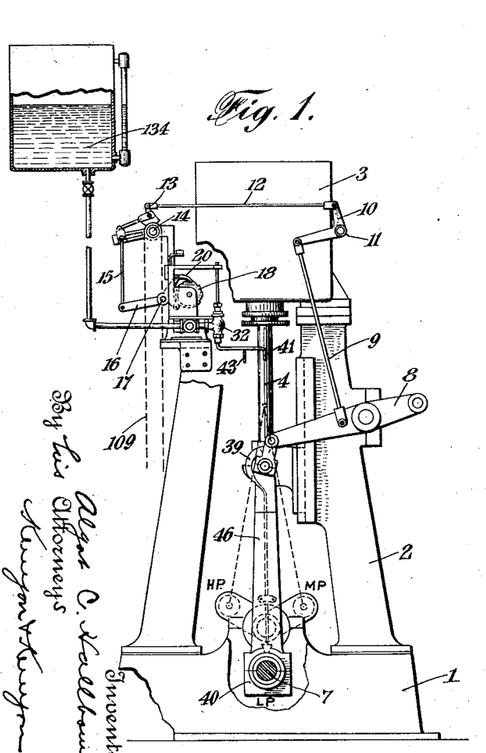
Figure 1 represents an elevation of a conventional triple expansion marine engine, somewhat in diagrammatic form, parts being broken away, showing oiler in relation to said engine.
Figure 3:
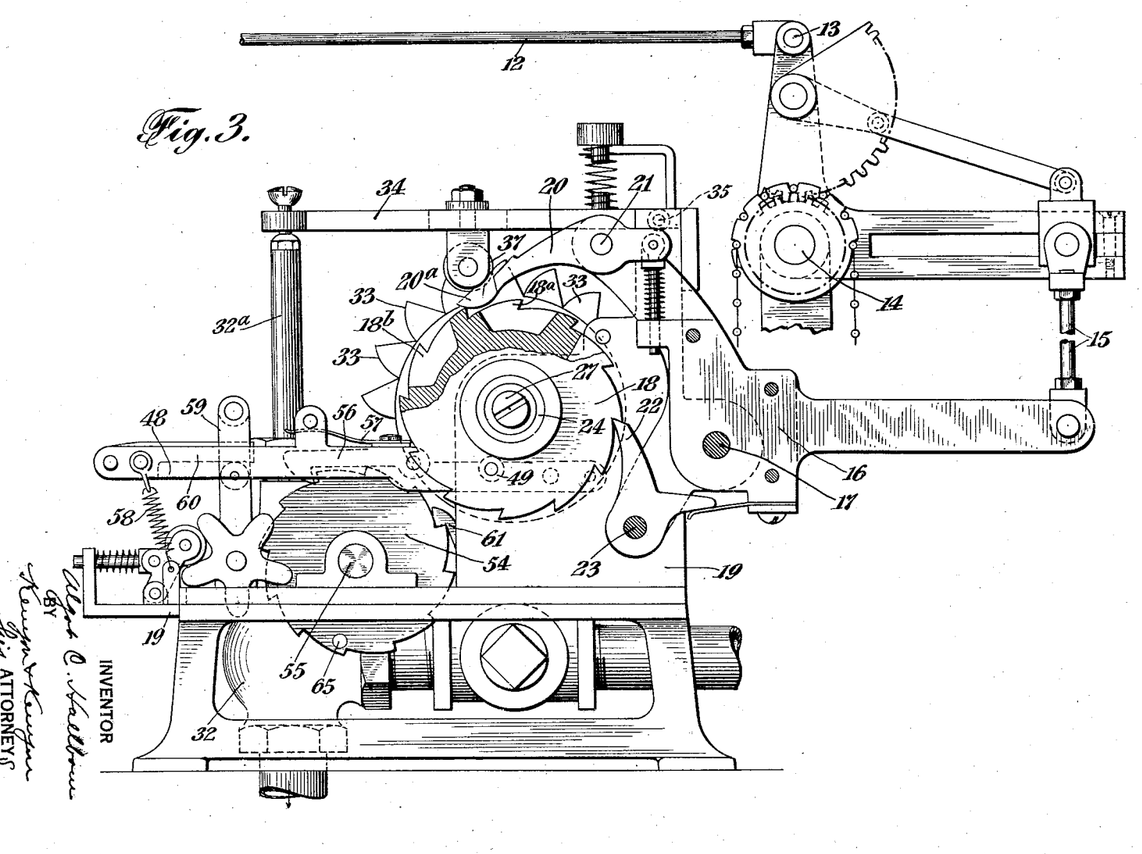
Fig. 3 is an end elevation on an enlarged scale, with parts in section.

The invention is shown as applied to a triple expansion engine but is thus shown merely for the purpose of illustration, as it obviously may be applied to any form of engine or mechanism which has moving parts that must be lubricated. Referring to Fig. 1 of the drawings, the engine comprises a bed-plate or base 1 with standards 2 thereon and cylinders 3. In the cylinders are pistons having piston rods 4, 5 and 6. These piston rods are connected with the crank shaft 7 in a well-known manner and impart rotation thereto. A detail description of the action and construction of the engine is not necessary as the same is well understood. The oiling device constituting my invention is operated from some suitable reciprocating or rotary member of the engine and in this instance by the balance 8. The operation of the oiling device is produced by the balance 8 through the rod 9, bell crank lever 10 which is pivoted at 11, rod 12, and bell crank lever 13 which is pivoted at 14, rod 15, and pawl 16, which pawl is pivoted at 17 and coöperates with the ratchet wheel 18, which is shown in enlarged view in Fig. 3.

As above stated, the pawl 16 is pivoted at 17 on the casing 19 of the oiler. The pawl 16 is of peculiar construction, being in fact a double pawl having one engaging member 20 pivoted at 21 and another engaging member 22 pivoted at 23, the pivotal points 21 and 23 being rigid with respect to the member 16 or mounted thereon. On the upper tooth 20 of the pawl there is located an elongation or spur 20$^a$, and in the ratchet wheel teeth 18$^a$ there is located a groove 18$^b$, which is sunk in every alternate one of the twelve teeth 18$^a$ of the wheel. This groove is adapted to receive the said spur 20$^a$ of tooth 20 of the pawl in order to enable the said tooth 20 to engage the teeth in which the grooves 18$^b$ are located. This spur 20$^a$ presents, on its under sides, a curved surface, as shown, which enables it to slide over instead of engaging each intervening, or grooveless tooth of the wheel in order to reach the next, or grooved one. The lower tooth 22 on the other hand engages all the teeth of the ratchet wheel 18. This arrangement is necessary to cause the apparatus to correct itself automatically during either accelerated or interrupted rotation of the engine. The ratchet wheel 18 is fixed to a shaft 24, which is carried in the frame 19, and is operated by the members 20 and 22, the ratchet wheel being given rotation by those members, the same being rotated a distance of one and one quarter tooth by the member 20 and a distance of three quarters of one tooth by the member 22, this total movement of two teeth being accomplished by one complete reciprocation of the balance 8. The motion given to the ratchet wheel 18 by the member 20 is imparted by the balance 8 while the said balance is rotating in a clockwise direction, as shown in Fig. 1, and the motion imparted to the wheel 18 by the member 22 is given thereto during the time that the balance 8 is revolving in a counter clockwise direction, as shown in Fig. 1. This co-ordination of the parts is important, as it is necessary that the lubricant be delivered to the crank shaft, for instance, while the point to which the lubricant is applied is rising in its rotation, that is to say, while it is approaching the upper dead center.

This device, as stated, is actuated by one of the reciprocating members of the engine to which it is connected, in this instance by the balance 8, Fig. 1. In the present instance the balance is shown connected to the low pressure cross-head 39. It is of the utmost importance for a correct understanding of the device and its operation to note that when the low pressure crank, L. P. is on the lower dead center, the medium pressure crank, M. P. is the first of the three cranks to approach the upper dead center, wherefore this crank will be the first to receive its quota of lubricant. Next in turn comes the low pressure crank, L. P. and last the high pressure crank, H. P. The connection must be effected in such manner that the pawl 16 at the moment the crank carrying the balance 8 is on the lower dead center, corresponds thereto so that the upper tooth 20 commences to push immediately upon the pawl 16 being actuated by the ascending balance crank. This is essential to insure a correct registering of the oil-cups of the various rods with the corresponding valves, without which correct oiling can not be effected. It is also of the utmost importance for the correct corresponding coupling and un-coupling of the valve section of the device in connection with each succesive periodic lubrication.

Figure 2:
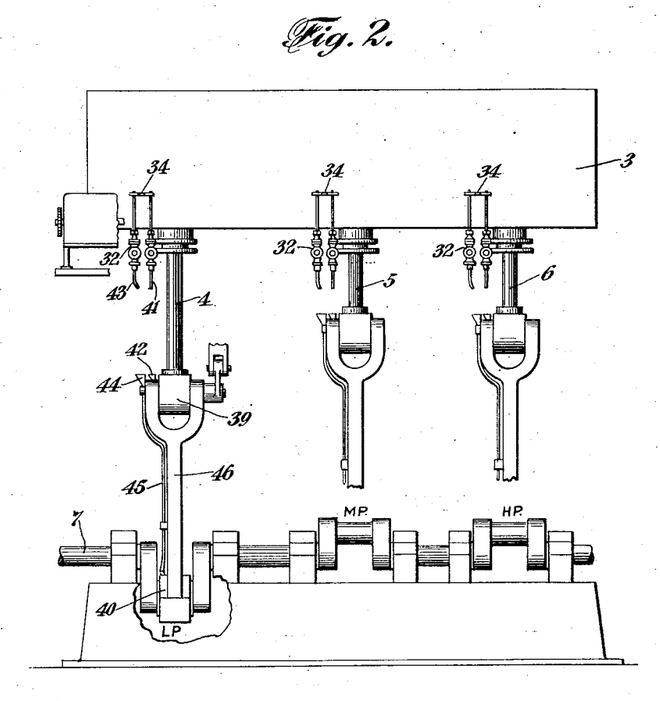
Fig. 2 is a side elevation of Fig. 1, also in diagrammatic form, parts being omitted, and parts broken away for the sake of clearness.
Figure 4:
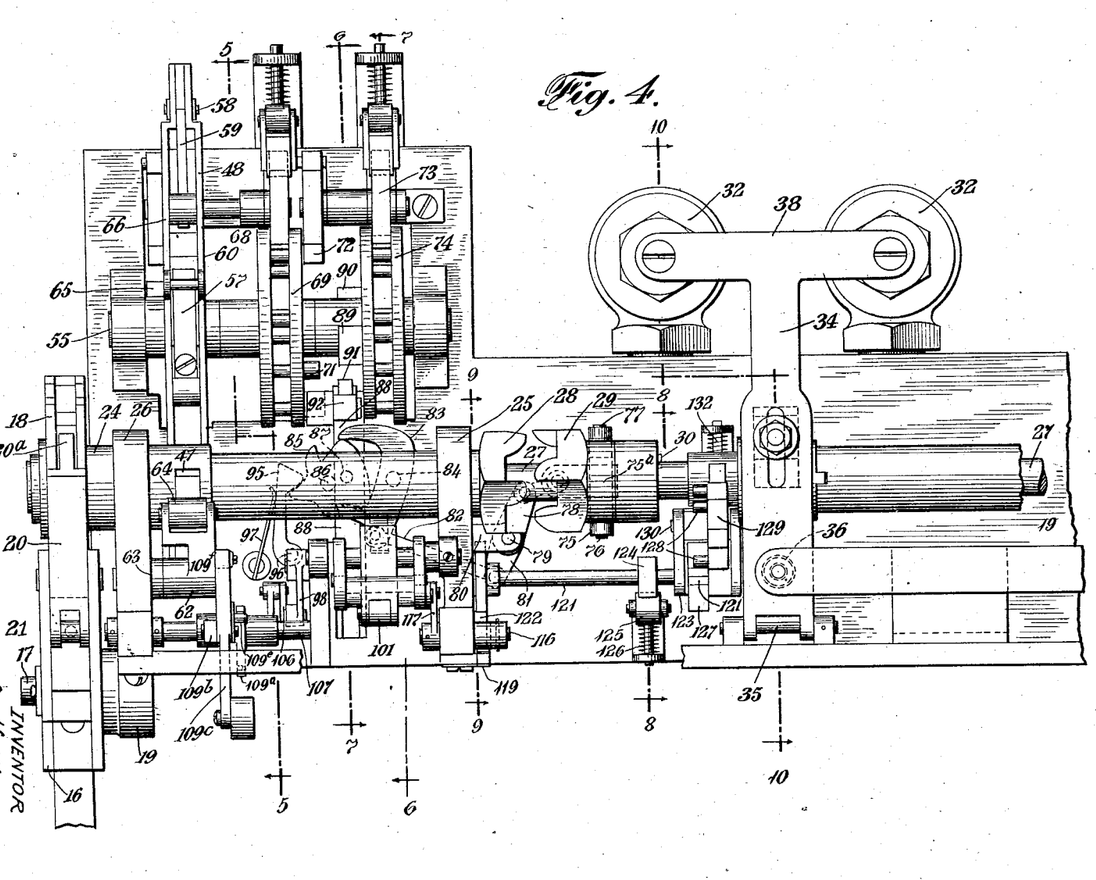
Fig. 4 is a plan view of the device with a portion thereof removed.
Figure 10:
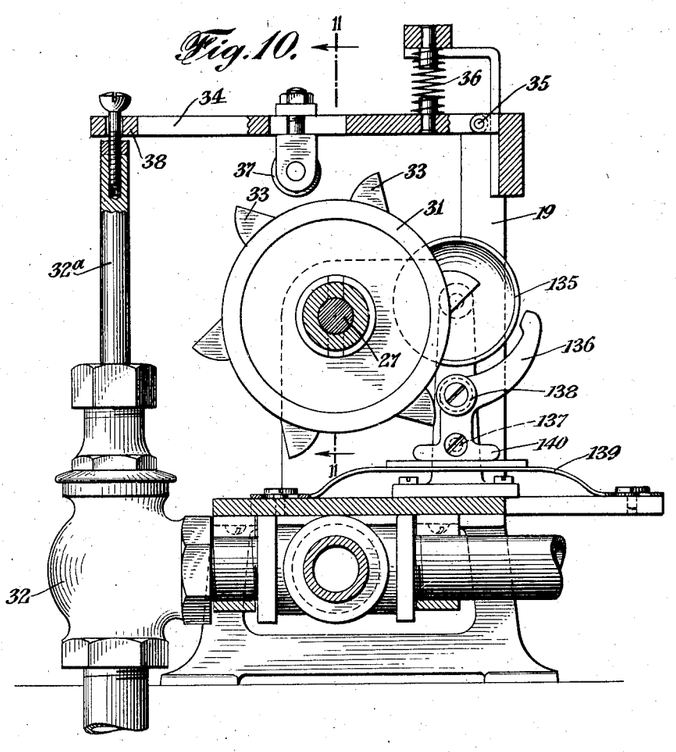
Fig. 10 is a vertical cross-section taken on line 10—10 of Fig. 4, looking in the direction of the arrows.
Figure 11:
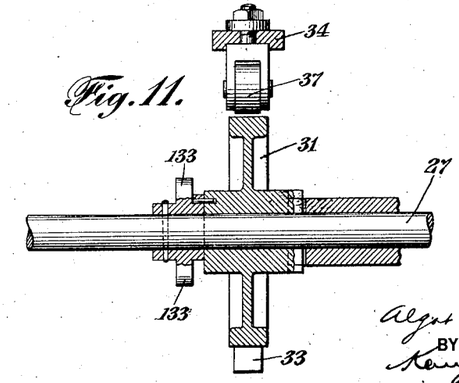
Fig. 11 is a detail section taken on line 11—11 of Fig. 10, looking in the direction of the arrows.
Figure 12:
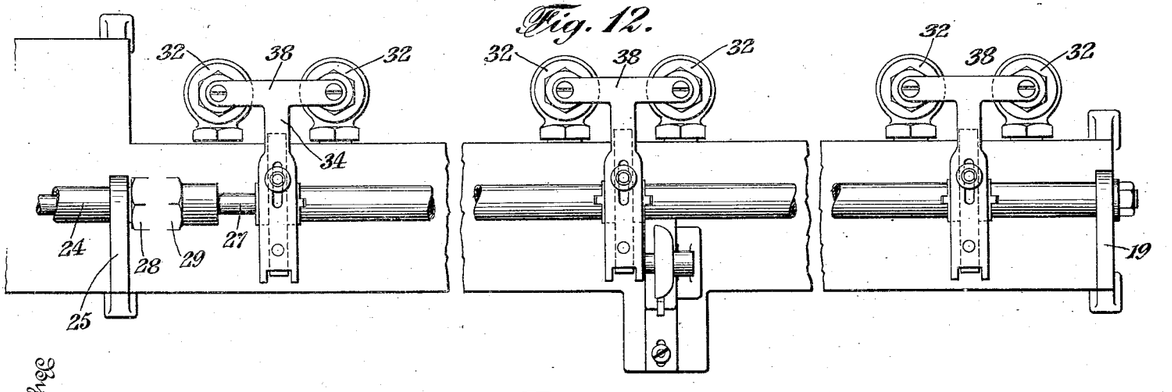
Fig. 12 is a fragmentary plan view of the controlling valves shown on a smaller scale.
Figure 13:
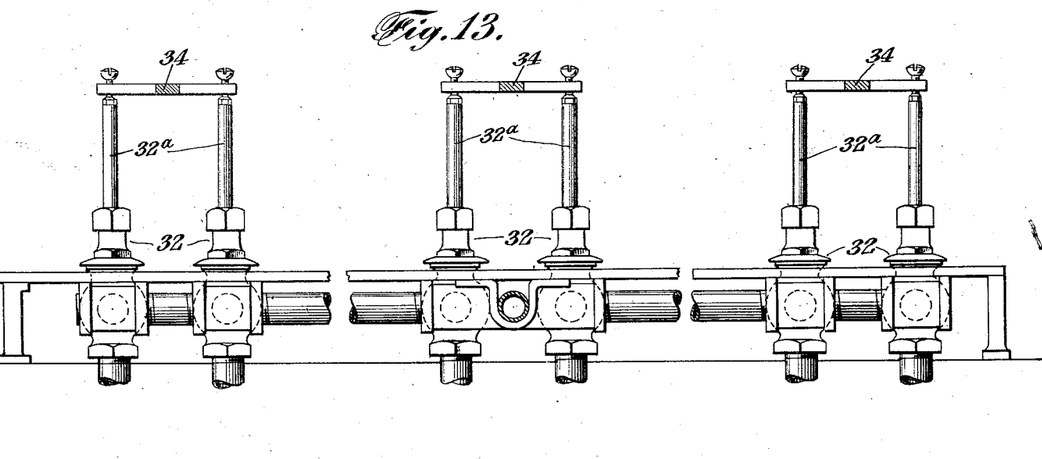
Fig 13 is a side elevation of Fig. 12, with parts omitted and parts in section.

The ratchet wheel 18, as above stated, is mounted on a shaft 24. This shaft 24 is hollow and is mounted in the frame 19 in journals 25 and 26. Mounted inside the shaft 24 is a solid shaft 27, one portion passing preferably almost entirely through the shaft 24 and the other portion extending through the entire length of the machine and being journaled at its end in the frame 19. Mounted on the shaft 24 is one member 28 of a clutch or coupling. Mounted on the shaft 27 is another and coöperating member 29 of coupling. This member 29, while slidable longitudinally on the shaft 27, is rotatably fixed relative to the shaft 27, the same being mounted so as to slide on a key 30, as shown in Fig. 4. Also mounted on shaft 27 is a series of wheels 31, one of which is shown in Fig. 10. There is one of these wheels for each lubricating valve 32 or pair of valves, as shown in Figs. 12 and 13. Wheels 31 which are mounted on shaft 27 have on their periphery cams 33. Connected with the stems 32$^a$ of the valves 32 is a member 34 which is pivoted at 35 to frame 19. This member 34 is held in position, as shown in Fig. 10, by a coil spring 36. Depending from the member 34 is a roller 37 which when engaged by a cam 33 is raised, which in turn raises member 34, together with the stem 32$^a$ of valve 32, thus opening the valve 32 for a short period of time. The member 34 is connected by a cross piece 38 with the stems of two valves 32, so that when the member 34 is raised two valves will be opened, thus oiling two points, such for instance as the cross head 39 and the crank shaft at point 40, as shown in Fig. 2, the oil reaching point 39 through a pipe 41 which squirts the oil in the receptacle 42, and the oil reaching the point 40 through a pipe 43 which squirts the oil in the receptacle 44, and which oil is then led to the point 40 through and by means of a pipe 45 which is fastened to and moves with the connecting rod 46. The cams 33 which are mounted on the wheels 31 are so angularly arranged relatively to shaft 27 with which their wheels revolve as to cause the valves 32 to open in proper sequence so as to deliver the lubricant to points 39 and 40 as the crank shaft is approaching its upper dead center. These wheels 31 are rotated through the coupling by means of the ratchet wheel 18 and pawl 16, and which means I will now describe:

The shaft 24 is constantly rotated, being rigid with the ratchet 18. Therefore the member 28 of the coupling is constantly rotated, the same being rigid with the shaft 24. During the greater part of the time the member 29 of the coupling is in position, as shown in Fig. 4, that is to say, it is disengaged from the member 28 so that the shaft 27 is not rotated during the time the members 28 and 29 are disengaged.

Figure 5:
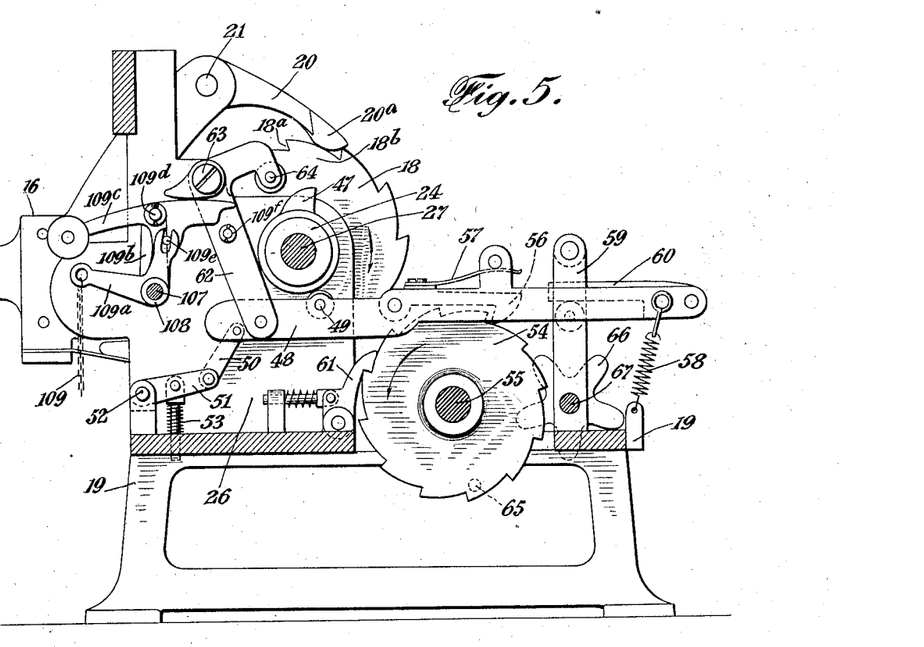
Fig. 5 is a cross-section taken on line 5—5 of Fig 4 looking in the direction of the arrows.

It has been found that in marine engines such as the type shown in the drawings, it is desirable to lubricate certain moving parts after the engine has revolved about a certain number of revolutions. I therefore provide means for automatically engaging the members 28 and 29 when the engine has revolved a given number of revolutions, and also provide means for disengaging the members 28 and 29 after the valves 32 have been operated a predetermined number of times, that is to say, after the engine has been sufficiently lubricated. The means for engaging the members 28 and 29 comprise a counting mechanism for counting the revolutions of the engine crank shaft and means for engaging the members 28 and 29 when that device registers the predetermined number of revolutions. By reference to Fig. 5, it will be noted that shaft 24 has mounted thereon a dog 47. Mounted just below the shaft 24 is a member 48 having a roller 49 thereon. The member 48 is reciprocated by the dog 47 engaging the roller 49. The left hand end of the member 48 is supported by a link 50 pivoted at one end to the member 48 and at the other end to a link 51, which link 51 is pivoted at 52 to frame 19. The member 51 is urged in an upward direction by a coil spring 53. The right hand end of member 48 is supported by a ratchet wheel 54 which is mounted on a shaft 55 journaled in the frame 19. The member 48 is provided with a pawl 56 which is pressed downwardly by spring 57. The member 48 is pulled downwardly at its right hand end by spring 58 which is fastened at one end to member 48 and the other to the frame 19. The member 48 is guided by an upright member 59 which is bifurcated and through the opening of which reciprocates a member 60 rigidly secured to the member 48. When the member 48 is moved to the left, Fig. 5, by the dog 47 engaging the roller 49, the pawl 56 engages a tooth on the wheel 54 and rotates the wheel 54 a distance of one tooth. This wheel is held in that position by a pawl 61, Fig. 5.

Figure 6:
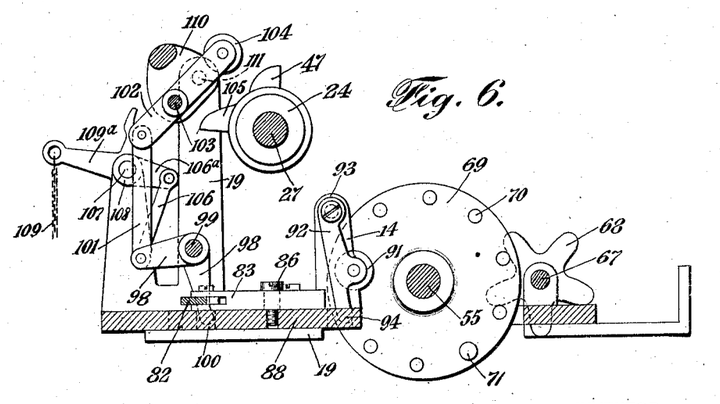
Fig. 6 shows a cross-section taken on a zig-zag line 6—6 of Fig. 4, looking in the direction of the arrows, with parts removed.

Pivotally connected to the member 48 is a member 62 which is pivoted at 63 to frame 19. This member 62 is in the form of a bell crank lever, on the free end of which is a roller 64. When the member 48 is moved to the left, as above explained, the member 62 is rotated around the pivot 63 and the roller 64 is brought into the path of the dog 47, which, as the shaft rotates in a clockwise direction, Fig. 5, engages the roller 64 and rotates the member 62 around the pivot 63 in a counter clockwise direction, thus moving the member 48 back to the position shown in Fig. 5. This operation is repeated each revolution of the shaft 24. The wheel 18 has twelve teeth, and as same is moved a distance of two teeth at each revolution of the engine crank shaft, the engine will make six revolutions to one revolution of the wheel 18. Projecting from the side of wheel 54 is a pin 65. The pin 65 in the course of the rotation of wheel 54 engages a toothed wheel 66, which is mounted in the upright member 59 on a shaft 67. Mounted on the shaft 67 is a second toothed wheel 68 similar to the wheel 66. Also mounted on the shaft 55 is a wheel 69 having teeth in the form of rods 70 arranged to be engaged by the wheel 68. When the pin 65 engages the wheel 66 and rotates the same one tooth, the wheel 68 is rotated an equal distance and the teeth of the wheel 68 engaging the rods 70 on wheel 69 rotates that wheel a distance of one tooth. There are ten rods 70 on the wheel 69, so that pin 65 must engage the wheel 66 and move it a distance of one tooth ten times in order that the wheel 69 may be revolved one revolution. Similarly the wheel 69 has a pin 71 on the outside thereof as shown in Figs. 4 and 6 and this pin engages a wheel 72 similar to the wheels 66 and 68. Connected with the wheel 72 is a wheel 73 which engages the teeth on a wheel 74 similar in all respects to wheel 69, so that for each revolution of wheel 69 the wheel 74 is revolved $\frac{1}{10}$ of one revolution. In order therefore that the wheel 74 should be given one revolution, it is necessary that the engine shaft complete 7200 revolutions, as the wheel 54 has twelve teeth, wheel 69 ten teeth and wheel 74 ten teeth, it requiring six revolutions of the engine to revolve the ratchet wheel 18 one revolution.

Figure 7:
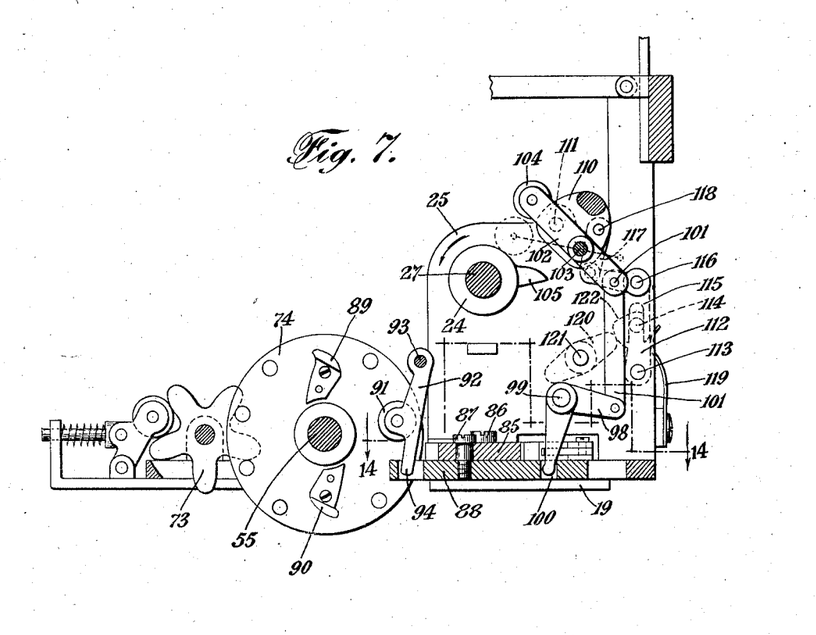
Fig. 7 is a similar cross-section taken on line 7—7 of Fig. 4, looking in the direction of the arrows, also with parts removed.
Figure 9:
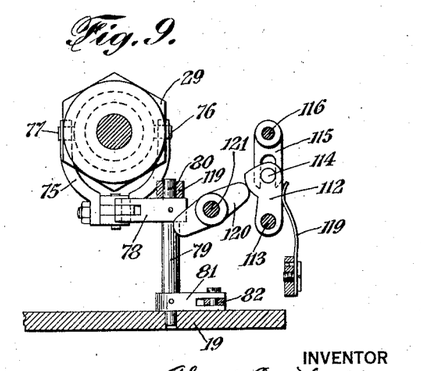
Fig. 9 is a section taken on line 9—9 of Fig. 4, looking in the direction of the arrows.

The coupling member 29, Figs. 4 and 9, has attached to it a bifurcated member 75, the member 75 being pivotally attached to pins 76 and 77, one on each side of member 29. Member 75 is pivotally connected to links 78, the links 78 being rigidly connected with an upstanding rod 79, the upper end of which is journaled at 80 in frame 19, and the lower end of which is also journaled in frame 19. The same member 75 is also connected by means of pins 76 and 77 to the collar 75ª, which encircles the clutch-member 29. The member 81 is rigidly connected with the member 79 and pivotally connected with the member 81 is a member 82. Member 82, as shown in Fig. 6, is pivotally conected with a member 83, which in turn is pivoted to the frame 19 at 84, Fig. 4. Member 83 is engaged and operated by a cam 85, which is pivoted to the frame 19 at 86. Attached to the member 85 at 87 is a member 88 which has a reciprocal movement in frame 19 and is given such movement by cams 89 and 90 which are on the wheel 74, as shown in Fig. 7. This movement is imparted to the member 88 through the engagement of cams 89 and 90 with a roller 91 in a member 92, which is pivoted at 93 in the frame 19 and has a lower free end 94 engaging an opening in member 88 for operating the same in one direction. The member 85 is held in both of its final positions by a pawl 95 which is pivoted at 96 in the frame 19 and which is urged in a clockwise direction, as shown in Fig. 4, by a spring 97. Since this pawl 95 acts to lock the cam 85 in the position shown, the cam 85 then in turn acts to positively lock the member 83 against movement, the force exerted tending to disengage the member 29 from the member 28. The bell crank lever 98 pivoted at 99 has one end which extends into an opening 100 in the member 88. The other end of the lever 98 is connected by a link 101 with a link 102 pivoted at 103 to a member 110 which member 110 is pivoted at 111 to frame 19. Member 102 has in its free end a roller 104, which in one position is engaged by a cam 105 on shaft 24, as shown in Fig. 6. Connected also to the bell crank lever 98 is a link 106 rigidly attached to a shaft 107 journaled in frame 19 and carrying a bell crank 109ª with a cord 109, or other suitable device, attached thereto for a purpose which will be explained later.

Referring to Fig. 7, the member 110 which is pivoted to frame 19 at 111 is controlled by a member 112 pivoted to the frame 19 at 113. The member 112 has a pin 114 thereon which works in a slot in a bell crank lever 115 pivoted to frame 19 at 116. The other end of the lever 115 is pivotally connected to a link 117, which is pivotally connected to the member 110 at 118. The arrangement of the members 112 and 115 form in essence a toggle, and operating at the joint of this toggle is a spring 119 acting to trip the same. On the opposite side of the spring 119 is a member 120 mounted on a shaft 121 which engages a cam surface 122 on the member 112 and holds the parts in the position shown in Fig. 7.

By reference to Fig. 4, it will be noted that the shaft 121 which carries the member 120 extends across the coupling and is journaled in the frame 19 at 123. The shaft is also journaled in the frame 19 at its left hand end, as seen in Fig. 4.

Figure 8:
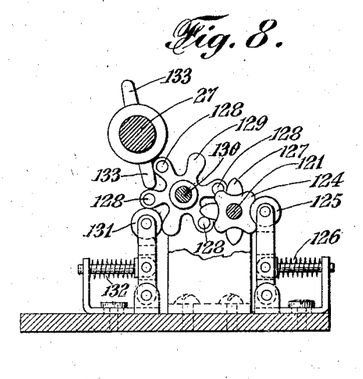
Fig. 8 is a detail section taken on line 8—8 of Fig. 4, looking in the direction of the arrows.

Referring to Fig. 8, the shaft 121 has a gear 124 which is engaged by a roller pawl 125 urged into contact with the gear 124 by a spring 126. This shaft has also a gear 127 thereon, which is operated by a pin 128 on a gear 129 which is mounted on a shaft 130 and which is held in its final positions by a roller 131 urged into contact therewith by a spring 132. The gear 129 is rotated by diametrically opposite projections 133 rigidly fastened on shaft 27 and which engage the teeth of the gear 129.

Figure 14:
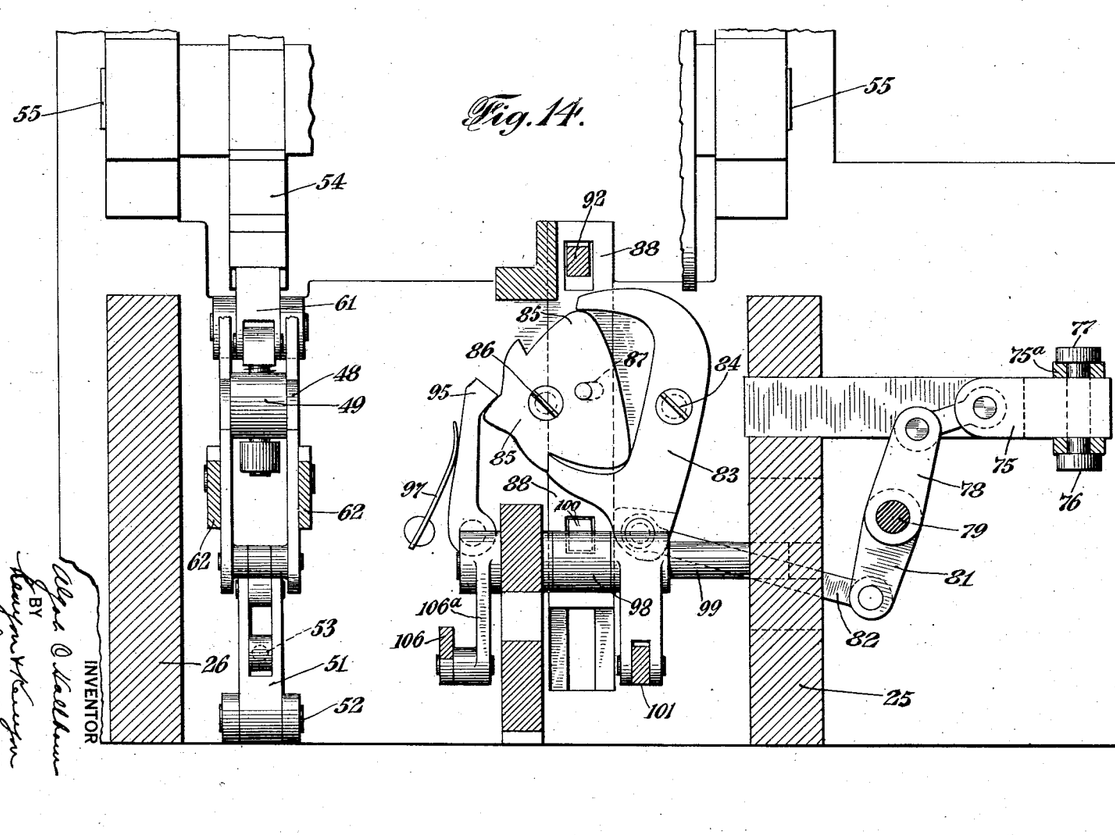
Fig. 14 is an enlarged horizontal section, taken on zig-zag line 14—14 of Fig. 7.

The following is a brief description of the operation of the device above explained:

As the engine rotates the pawl 16 is reciprocated and the ratchet wheel 18 is rotated. This rotation is transmitted as above explained to the counting mechanism. The predetermined number of revolutions having been completed, the cam 89 for instance engages the roller 91, Fig. 7, rotating the member 92 counter clockwise and pushing member 88 to the right. This movement rotates the member 85, Fig. 14, in a clockwise direction around the pivot 86, which in turn rotates the member 83 in a counter clockwise direction around the pivot 84. This moves the member 82, Fig. 4, to the right, rotating the member 79 in a counter clockwise direction, which in turn causes the clutch member 29 to engage member 28 and complete the coupling between shaft 24 and shaft 27. The rotation of the ratchet wheel 18 by the engine is therefore imparted through the shaft 24, coupling 28—29 to the shaft 27, which in its rotation revolves the wheels 31 having cams 33 thereon. The cams 33 engage the rollers 37 on the various members 34 and operate the lubricating valves 32, through the stems 32ª, opening the same and permitting the lubricant to flow from the reserve tank 134 through the various pipes 41 and 43 onto the parts to be lubricated. When the device is being used on a triple expansion engine of the type shown, and the coupling is engaged, two of the cross heads and two points in the crank shaft will be lubricated upon the upward movement of the rod 9, or while the ratchet wheel 18 is being moved by the member 20, the other cross head and third point on the crank shaft will be lubricated as the balance 8 and the rod 9 move downward in a clockwise direction, as shown in Fig. 1. The coupling will remain engaged until the desired points have been lubricated a predetermined amount, whereupon the coupling will be disengaged and the lubricating action discontinued for a predetermined number of revolutions.

The clutch will be disengaged by the following means:

In order for the clutch to be disengaged, the parts 112, 115 and 120 must be in the relative position shown in Fig. 9, and the roller 104, as shown in Fig. 7, should have the position in which it is shown in dotted lines in that figure. The parts being in the position indicated, and the shaft 24 being rotated, the cam 105 will engage the roller 104, which in turn will operate the link 102 around the pivot 103 in a counter clockwise direction, pushing the parts to positions shown in Figs. 6 and 7. When dog 47 engages the roller 49 the dog 105 is in a position 180° from that shown in Fig. 6 so that upon three revolutions of the engine the dog 105 would engage roller 104 and disengage the coupling. If it is desired that the points to be lubricated should receive more than three—say five—applications of the lubricant, means must be provided for allowing the roller 104 to take a position out of the path of the cam 105 without disconnecting the coupling. This is accomplished by means of the gears 129 and 127 being rotated by the projections 133 on shaft 27, Fig. 8. These gears determine the position of the member 120 and in turn the position of the members 112 and 115. By the arrangement shown in Figs. 8 and 9, the shaft 121 is rotated at the proper time an amount sufficient to rotate the member 120 through an angle of approximately 90° which will permit the spring 119 to push the member 112 in a counter clockwise direction, in Fig. 7, which in turn will permit the member 110, in which a member 102 is pivoted, to rotate in a clockwise direction around the pivot 111, and this movement of the parts will throw the roller 104 out of the path of the cam 105 so that as the cam passes the point of the roller it will not engage the same and therefore will not disengage the clutch. At the predetermined time, the parts will be placed in the position shown in Figs. 6 and 7, and the clutch will be disengaged as above explained by the member 105 engaging the roller 104.

It not infrequently happens that the parts to be lubricated need extra lubricant, and means should be and are provided by my device for enabling the person in charge to apply additional lubricant when desired and to the amount required, as for instance when the engine "races," or during maneuvering. The means in question are represented by parts 106, 106ª, 107, 109, 109ª, 109ᵇ, 109ᶜ, 109ᵈ, 109ᵉ and 109ᶠ in Figs. 5 and 6. Upon inspection of this arrangement it will be evident that by pulling on the chain or cord 109, the parts will be given a movement which will cause the clutch member 29 to engage the member 28, whereupon lubricant will immediately be caused to flow through the lubricating valve 32. Upon release of the chain 109 the clutch will be automatically disengaged and the lubricating action will be stopped.

In Fig. 10 is shown an arrangement whereby an audible signal is given each time lubricant is applied to the part to be lubricated. This device comprises a bell 135 which is fastened onto the frame 19. The hammer 136 for striking the bell is pivoted to the frame at 137. As the cams 33 on the wheel 31 rotate with the shaft 27 they engage a roller 138 moving the hammer 136 in a clockwise direction around the pivot 136, and as the cams pass away from the roller 138 the hammer 136 is caused to strike the bell 135 by reason of the spring 139 which acts on 140 of the hammer 136. The relative position of the rollers 138 and 37 may be varied so that the tap of the bell will take place as the oiling operation begins or as it ends, or while the oiling is taking place.

It will be noted that in the arrangement shown the wheel 74 is provided with two cams 89 and 90, same being diametrically opposite each other. When the wheels of the counter and the ratchet wheel are arranged as shown in the drawings, the clutch will be engaged after 3600 revolutions of the engine first by cam 89 and then after 3600 more revolutions by the cam 90. Obviously, if there were more pins on counting wheel 54, the oiling would take place at more frequent intervals. That is to say, if there were two pins corresponding with the pin 65, Fig. 5, diametrically opposite each other the oiling would occur upon the engine making one-half the revolutions which would be required if there were only one pin as shown.

In order to facilitate a proper adjustment of the device to the engine, it must be provided with as many valve-series as the engine has points on the crank shaft or elsewhere to be oiled. That part which is to lubricate the balance-crank must be located on the balance-engine. This part is preferably the device itself with attached valve-series as illustrated herein and containing the complete mechanism. The others which are to lubricate the remaining points on the crank shaft or other parts of the engine are located on the respective engine of each and comprise merely the necessary valves and cam wheels and are connected to the main part of the device by steel rods or other couplings. The main part of the device, then, regulates simultaneously both its own oiling operations and those of the other parts of the engine. All of the parts are, as stated, in communication with the reserve tank by means of suitable tubing.

While I have described my device in all its details and while the same embodies the complete and preferred form of my invention, nevertheless I do not limit my invention to the particular arrangement shown, as the various essential parts may take many different forms without departing from the spirit of my invention.

Having thus described my invention what I claim as new and desire to secure by Letters Patent is:

1. In an oiler, the combination of a reciprocating element, a pawl operated thereby, a ratchet wheel operated by said pawl, valves normally closed, a shaft connected to said ratchet wheel and rotated thereby, a shaft for operating said valves, a coupling for connecting said shafts and means operated by said reciprocating elements for automatically engaging and disengaging said coupling.

2. In an oiler, the combination of a shaft operated by the machine to be oiled, valves for controlling the oil flow, a shaft for operating said valves, a coupling for connecting said shafts, and means operative upon the machine having made a predetermined number of revolutions for engaging said coupling and for disengaging said coupling after said valves have been operated in a predetermined manner.

3. In an oiler, the combination of valves for controlling the oil flow, a normally stationary shaft, means on said shaft for operating said valves upon the machine having completed a predetermined cycle of operation and for stopping the operation of said valves after a predetermined cycle of operation.

4. In an oiler, the combination of a plurality of valves for controlling the oil flow, a normally stationary shaft, means on said shaft for operating said valves, means for rendering the valves operating means effective by rotating said shaft and ineffective by stopping the rotation of said shaft at predetermined times, said last means being controlled by the machine to be oiled.

5. In an oiler, the combination of a plurality of valves for controlling the oil flow, intermittently rotating cams for operating said valves in a desired sequence, means for operating said cams and means for controlling the intermittent operation of said cam operating means dependent upon the predetermined oil needs of the machine to be oiled.

6. In an oiler, the combination of a source of oil supply, pipes for connecting the said source to the parts to be oiled, means controlling the oil flow through said connecting pipes, a clutch operated by the machine to be oiled for controlling the operating of said means as to the sequence and period of operation.

7. In an oiler, the combination of a source of oil supply, pipes for connecting the said source to the points to be supplied, valves in said pipes for controlling the oil flow therethrough, a shaft operated by the machine to be oiled, a shaft for operating said valves, a coupling for connecting said shafts together, means for controlling said coupling and acting to engage said coupling when the machine to be oiled has made a predetermined number of revolutions and to disengage said coupling when said valves have been operated a predetermined number of times.

8. In an oiler, the combination of a source of oil supply, pipes for connecting the source to the parts to be oiled, valves in the pipes for controlling the flow of oil therethrough, a shaft, cams operated thereby for operating said valves and means controlled by the machine to be oiled for operating said shaft.

9. In an oiler, the combination of a source of oil supply, pipes for connecting said source with the parts to be oiled, valves in said pipes for controlling the oil flow, means for operating said valves, a continuously rotating shaft operated by the machine to be oiled, means for connecting said shaft with said valve, operating means at predetermined times to operate the valves at predetermined times and in a predetermined manner.

10. In an oiler, the combination of a source of oil supply, pipes for connecting the said source with the parts to be oiled, valves in said pipes, means for operating said valves to supply oil in accordance with the needs of the parts to be oiled, means for determining the time and period of oil supply through said valves and means operated by the machine to be oiled for controlling said last named means.

11. In an oiler, the combination of a source of oil supply, pipes for connecting said source with the parts to be oiled, valves in said pipes for controlling the oil flow, a shaft for operating said valves, a shaft operated by the machine to be oiled, a coupling between said shafts, means effected by each revolution of the machine to be oiled and becoming effective to engage and lock said coupling upon said machine making a predetermined number of revolutions and to become effective to disengage and lock said coupling when said valves have performed a predetermined operation.

12. In an oiler, the combination of a source of oil supply, pipes connecting said source to the parts to be oiled, valves in said pipes, means for counting the number of revolutions of the parts to be oiled, means operated by the machine to be oiled for operating said valves, means operated by said counter for rendering said valve operating means effective and means operated by the valve operating means for rendering said means ineffective.

13. In an oiler, the combination of valves for controlling the oil flow, means for operating said valves upon the machine having completed a predetermined cycle of operation and for stopping the operation of said valves after a predetermined cycle of operation, and manually operated means for causing said valves to be operated at any desired time.

14. In an oiler, the combination of a reciprocating element, a pawl operated thereby and having two actuating elements, a ratchet wheel having teeth thereon and operated partly by one of said actuating members and partly by the other, valves normally closed, a shaft connected to said valves, a shaft operated by said ratchet wheel, a coupling for connecting said shafts together, and means operated by said reciprocating elements for automatically engaging and disengaging said coupling.

15. In an oiler, the combination of a reciprocating element, a pawl operated thereby and having two actuating elements, a ratchet wheel having teeth thereon and operated partly by one of said actuating members and partly by the other, valves normally closed, a shaft connected to said valves, a shaft operated by said ratchet wheel, a coupling for connecting said shafts together, means operated by said reciprocating elements for automatically engaging and disengaging said coupling, and means preventing one of said actuating members from rotating said ratchet wheel except upon engagement thereby of certain predetermined ones of the teeth on said wheel.

16. In an oiler, the combination of a reciprocating element, a pawl operated thereby and having two actuating members, a ratchet wheel having two kinds of teeth, one kind only of said teeth being adapted to be operated by one of said actuating members, the other member acting to operatively engage each tooth on said wheel, a shaft rotated by said wheel, means for controlling the flow of lubricant, means for operating said means, and means operative at predetermined times for causing said lubricant controlling means to become operative and to render same inoperative after a predetermined cycle of operation.

In testimony whereof I have signed my name to this specification.

ALGOT C. HALLBOM.